United States Patent [19]
De Langis

[11] 3,821,639
[45] June 28, 1974

[54] SOCKET GROUND LINE TESTING APPARATUS

[76] Inventor: Philip A. De Langis, 4060 226th St., Torrance, Calif. 90505

[22] Filed: Mar. 19, 1973

[21] Appl. No.: 342,403

[52] U.S. Cl. .................................. 324/51, 317/18 B
[51] Int. Cl. ............................................. G01r 31/02
[58] Field of Search ................ 324/51, 66; 340/255; 317/18 A, 18 B

[56] References Cited
UNITED STATES PATENTS
| | | | |
|---|---|---|---|
| 3,205,436 | 9/1965 | Donahue | 324/51 |
| 3,368,146 | 2/1968 | Regan et al. | 324/51 |

FOREIGN PATENTS OR APPLICATIONS
| | | | |
|---|---|---|---|
| 628,667 | 9/1949 | Great Britain | 324/51 |
| 771,537 | 4/1957 | Great Britain | 324/51 |
| 748,458 | 5/1956 | Great Britain | 324/51 |

Primary Examiner—Gerard R. Strecker
Attorney, Agent, or Firm—Herman L. Gordon

[57] ABSTRACT

Apparatus to test the quality of socket wiring, namely, whether or not a supply socket has a grounded line terminal and the quality of the grounding connection. A load resistance is connected through a first double-pole, double-throw switch and a second double-pole, double throw switch to a 3-prong plug, and a meter is connected so as to measure either the line voltage or the voltage drop in the line grounding system. If there is no ground connection at the supply socket, the meter reads the line voltage. If there is a ground connection at the supply socket, the meter will give a relatively low reading, namely, the voltage drop in the line grounding system, in one switching configuration, and will give the line voltage in another switching configuration.

5 Claims, 2 Drawing Figures

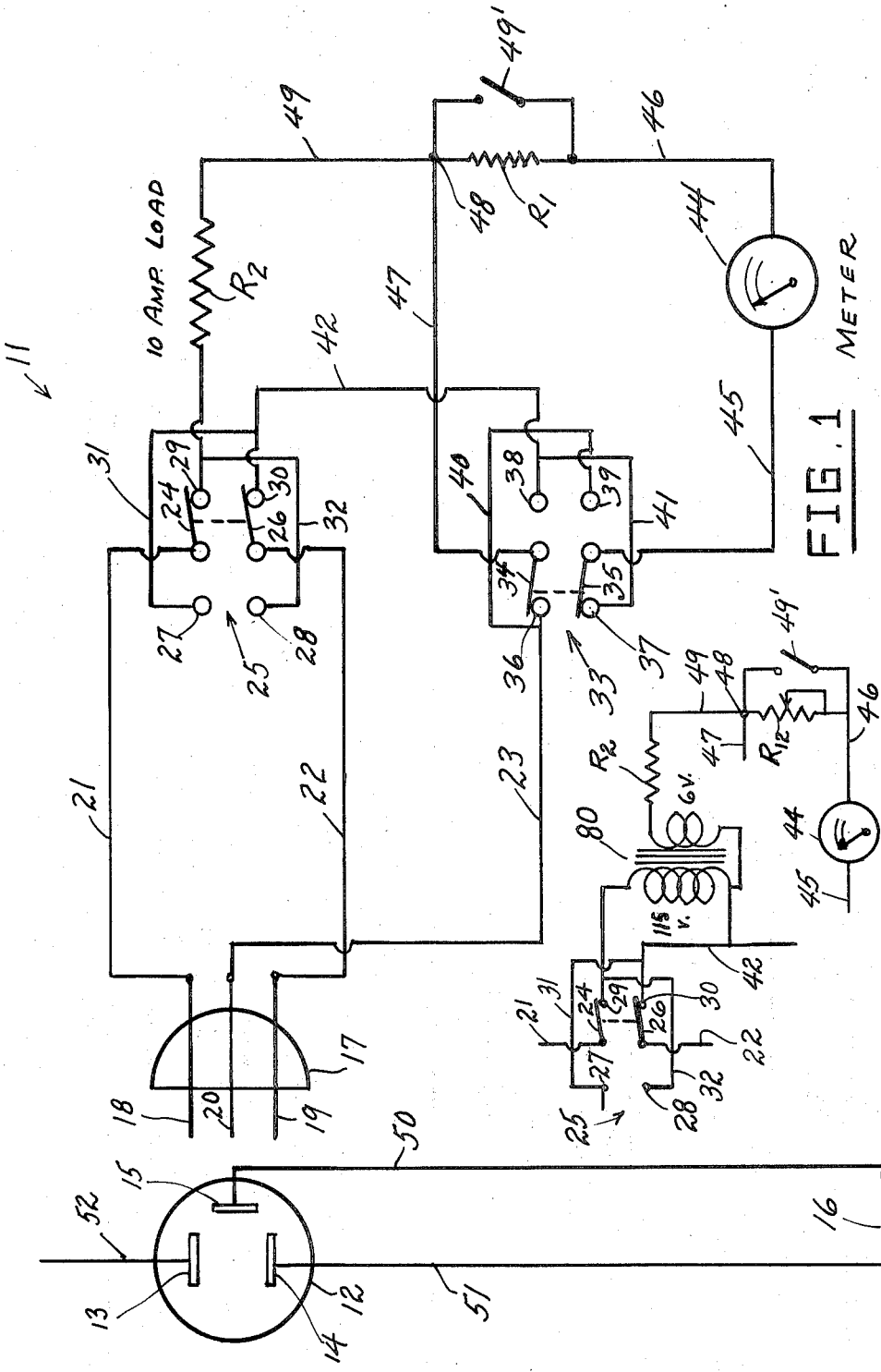

SOCKET GROUND LINE TESTING APPARATUS

This invention relates to electrical safety devices, and more particularly to apparatus to ascertain whether or not a supply socket has a properly grounded line terminal.

A main object of the invention is to provide a novel and improved test apparatus to ascertain whether or not a supply socket has a properly grounded line terminal, so as to reduce electrical hazards in using appliances or instruments with said supply socket, the test apparatus being simple in construction, being easy to operate, and providing a positive indication as to the presence or absence of a properly grounded socket line terminal.

A further object of the invention is to provide an improved instrument for testing a supply socket so as to ascertain the presence or absence of a properly grounded line terminal therein, the instrument employing relatively inexpensive components, being compact in size, being reliable in operation, and greatly reducing the risk of electrical shock or other injuries in using equipment with the supply socket.

Further objects and advantages of the invention will become apparent from the following description and claims, and from the accompanying drawings, wherein:

FIG. 1 is a wiring diagram of an improved ground testing instrument constructed in accordance with the present invention.

FIG. 2 is a partial wiring diagram showing a modification of the instrument of FIG. 1.

Referring to the drawings, 11 generally designates a typical ground testing apparatus according to the present invention, adapted to be plugged into a wall socket 12 to ascertain whether or not the female ground line terminal 15 is properly grounded and to ascertain the quality of the ground connection. The wall socket 12 may be of the conventional type having a female ground terminal 15 which is connected to a ground line conductor 50 in accordance with conventional practice, said conductor 50 being connected to ground in any suitable manner.

In accordance with standard practice, one of the two supply conductors 52 and 51 leading to the socket terminals 13 and 14 is connected to the ground line 50 at a relatively remote location, for example, at the fuse box or circuit breaker box associated with the electrical wiring system of the building. Such a ground connection is diagrammatically indicated by the dotted line 16 connecting the line conductor 51 to the ground line conductor 50. A faulty ground connection in the system wiring may be caused by the absence of the dotted connection shown at 16 or by a break in the line 50.

In the absence of a proper ground connection, if an appliance or instrument having outer parts of conductive material were plugged into the socket 12, this would expose the user to possible shock hazard. If the outside conductive parts of the appliance or instrument are joined by a conductive path to an energized part of the appliance or instrument either as a result of deterioration of insulation or a mistake in wiring, or by any other circumstance, and there is a low resistance path from the user to ground, electric current may pass from the exposed conductive part of the device through the user's body to ground. Metal housings and handles are the most common examples of such outer parts of an electrical device which may be handled by the user while the device is energized. A conventional method of protecting the user against such hazards is to ground the outer conductive parts of the device so that there cannot be any significant difference of potential across the user's body, from the device to ground when the device is energized. To accomplish this purpose, the appliance or instrument is provided with a three-prong line plug having a ground prong connected to the exposed outer conductive parts of the device, said ground prong being adapted to be conductively received in the female ground terminal 15 of the associated supply socket 12, whereby the exposed outer conductive parts of the device will be safely grounded, assuming the existence of a proper ground connection in the socket wiring, such as a connection 16. In the absence of a ground connection 16 there is no protection against the above-described shock hazard.

A prime purpose of the present invention is to provide a conveniently usable means to ascertain the presence of the socket ground connection elements 16 and 50 and to ascertain their quality.

The testing apparatus 11 comprises a conventional three-prong plug 17 having the line prongs 18, 19 and the ground prong 20, suitably spaced to be respectively received in the socket female terminals 13, 14 and 15. Respective line cord conductors 21, 22 and 23 are connected to the prongs 18, 19 and 20. Conductor 21 is connected to one pole 24 of a first double-pole, double-throw switch 25 and conductor 22 is connected to the remaining pole of said switch.

Switch 25 has a first pair of stationary contacts 27 and 28 engageable by poles 24 and 26 in one closed position of the switch and a second pair of stationary contacts 29 and 30 engageable by said poles in the opposite closed position of the switch. The diagonally opposite contacts, 27, 30 and 28, 29 are connected by respective reversing conductors 31 and 32.

Designated at 33 is a second double-pole, double-throw switch having the poles 34 and 35 and the respective pairs of stationary contacts 36, 37 and 38, 39 engageable by said poles in respective opposite closed positions of the switch. The diagonally opposite contacts 36, 39 and the diagonally opposite contacts 37, 38 are connected by respective reversing conductors 40 and 41.

Stationary contact 30 of switch 25 is connected to stationary contact 38 of switch 33 by a wire 42. A meter 44 has one terminal thereof connected by a wire 45 to pole 35 of switch 33. The other terminal of the meter is connected by a wire 46 through a multiplier series resistor $R_1$ and through a wire 47 to the other pole 34 of switch 33. The junction 48 between wire 47 and multiplier resistor $R_1$ is connected through a wire 49 and a relatively low-value load resistor $R_2$ to stationary contact 29 of switch 25.

Load resistor $R_2$ is of a value such as to draw a substantial amount of current when connected across a 115 volt source, for example, a current of the order of 10 amperes.

A shunting switch 49 is connected across resistor $R_1$ for at times shunting said resistor, for example, to provide increased meter sensitivity. Resistor $R_1$ is preferably of a value such that with a given potential between junction 48 and wire 45, meter 44 will provide a scale reading, with switch 49' open, of one-tenth of the scale reading obtained with switch 49' closed. Thus resistor $R_1$ preferably has a resistance value nine times the d.c. resistance of meter 44.

In using the ground testing apparatus 11, the plug 17 is inserted in the socket 12 intended to be tested.

If there is no ground connection from terminal 15 through elements 50 and 16 for the supply socket 12, the meter 44 will read the line voltage (for example, 115 volts) in one closed position of switch 33 and both closed positions of switch 25. For example, if poles 24,26 are engaged with contacts 29, 30 and poles 34, 35 are engaged with contacts 36, 37, the meter will be connected in a circuit comprising line terminal 13, prong 18, wire 21, pole 24, resistor $R_2$, wire 49, resistor $R_1$, a wire 46, meter 44, wire 45, pole 35, wire 41, wire 42, pole 26, wire 22, prong 19 and line terminal 14. A similar circuit will be established for the other position of switch 25 since this switch is connected merely as a reversing switch. In the opposite position of switch 33, meter 44 will read the voltage drop in line 51 and connection 16. Switch 25 will simply reverse the polarity. Therefore meter 44 will still read the voltage drop caused by the 10 ampere current in line 51 and connection 16.

If there is a ground connection of the type above described, for example, at a location on line 51 remote from socket 12, with switch 49 open, the meter will give a low reading with poles 24, 26 engaged with contacts 29, 30 and poles 34, 35 engaged with contacts 36, 37, since under these conditions the load resistor $R_2$ is connected across the supply line through a circuit comprising the portion of line wire 51 below the ground connection 16, ground connection 16, ground wire 50, ground terminal 15, prong 20, wire 23, pole 34, wire 47, wire 49, resistor $R_2$, pole 24, wire 21, prong 18, line terminal 13 and supply wire 52. A substantial current flows in this circuit, namely, 10 amperes, which may produce a measurable voltage drop between ground connection 16 and ground terminal 15. Meter 44 is connected so as to measure this voltage drop, since meter terminal wire 46 is connected through resistor $R_1$, wire 47, pole 34, wire 23, prong 20 and terminal 15 to one end of ground wire 50 and meter wire 45 is connected through pole 35, wire 41, wire 42, pole 26, wire 22, prong 19, terminal 14 and wire 51 to ground connection 16 and the other end of the current-carrying portion of ground wire 50. The meter will then read said voltage drop, which will be in accordance with the combined resistance of ground connection 16 and the current-carrying portion of ground wire 50. Since this voltage drop will ordinarily be quite low, the switch 49' may be closed to increase the sensitivity of the meter. This provides a quantitative measurement of the quality of the ground connection 16 and the associated current-carrying portion of ground wire 50.

If switch 33 is now reversed, the load wire 49 is connected to the line terminal 14 through wire 47, pole 34, wire 42, pole 26, wire 22 and prong 19, and the 10 ampere load current flows through the portion of supply wire 51 above the ground connection 16. Meter wire 46 will be connected through resistor $R_1$ to line terminal 14 (via wire 47, pole 34, wire 42, pole 26, wire 22 and prong 19). Meter wire 45 will be connected to ground wire 50 (via pole 35, wire 40, wire 23, prong 20 and terminal 15), and since the meter draws practically no current, the meter will substantially read the voltage drop in supply wire 51 between ground connection 16 and line terminal 14. As previously mentioned, this reading may be made more measurable by closing switch 49'. Thus, in this reversed position, a quantitative measurement of the quality of the ground connection 16 and the associated current-carrying portion of supply wire 51 may be obtained.

Switch 33 provides a means of connecting the ground return wire 49 of the load resistor $R_2$ either to the wire 23 (and thus to the grounding wire 50 of the supply system) or to the wire 22 leading to the supposedly grounded supply wire 51. The apparatus thus provides a means of individually testing both of these ground conductors.

If switch 25 is reversed, under the conditions above described, the meter 44 will determine if line voltage is present and will read the value of said line voltage, for example, 115 volts, and load resistor $R_2$ will be connected across the grounded conductors 22, 23 in one position of switch 33 (with poles 34, 35 engaging contacts 36, 37) and across the line in the other position of switch 33 (with poles 34, 35 engaging contacts 38, 39). The reversing switch 25 therefore enables the ground connection 16 to be detected and measured whether it is made between one supply line wire 51 and ground wire 50 or between the other supply line wire 52 and ground wire 50, and the low voltage-reading position of switch 25 may be employed to provide an indication as to which line supply conductor 51 or 52 is grounded.

Switch 33 applis the 10 ampere load to either the system ground wire 50 or the power line ground wire 51. This provides a means of individually testing these ground wires. Where the load is applied to one ground wire, the meter uses the other ground wire to measure the voltage drop under load across said other ground wire. This checks the voltage drop across the full length of the grounded wire even if it is several thousand feet long. Since the meter draws a very minimal current it causes no appreciable voltage drop in the opposite line. The voltage drop read on the meter 44 would be that of the line under test. Reversing the switch 33 reverses the procedure so as to test the opposite line.

FIG. 2 shows a modification of the circuit of FIG. 1 wherein a step-down transformer 80 is employed between the reversing switch 25 and the load resistor $R_2$. Thus, the primary and secondary of transformer 80 have a common junction connected to wire 42, and resistor $R_2$ is connected between the remaining secondary terminal and the wire 49. The 115-volt transformer primary winding is connected across the contacts 29 and 30 of reversing switch 25. Also, a variable resistor $R_{12}$ may be employed in place of the fixed multiplier resistor $R_1$.

While a specific embodiment of an improved socket ground line testing apparatus has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A test apparatus for use with a supply socket of the type having a pair of female line terminals with respective supply line wires, one of which is a power line ground wire, connected to said terminals and a female ground terminal with a system ground conductor presumably connected to said ground terminal, a male plug having line prongs engageable with said female line terminals and a ground plug prong engageable with said female ground terminal, a first double-pole, double-throw reversing switch having its poles connected to said line prongs and having diagonally connected respective pairs of stationary contacts, a load impedance and meter connected in a series circuit to define a common junction, circuit means connecting the outside terminal of the load impedance in said series circuit to one pair of diagonally-connected stationary contacts, a second double-pole, double-throw reversing switch having its poles respectively connected to said common junction and the outside terminal of said meter in said series circuit and having diagonally-connected pairs of stationary contacts, the junction-connected pole being engageable with one of one pair of the last-named diagonally-connected stationary contacts in one closing position thereof and with one of the other pair of the last-named diagonally-connected stationary contacts in its opposite closing position, circuit means connecting the ground prong to one pair of diagonally-connected contacts including said stationary contact of the second double-pole, double-throw switch engageable by the junction-connected pole in said one closing position of said second switch, and circuit means connecting the stationary contact engageable by said junction-connected pole in said opposite closing position to the other pair of diagonally-connected contacts of the first double-pole, double-throw switch, whereby the system ground wire and the power line ground wire may be individually tested by operating the second double-pole, double-throw switch to apply current drawn by said load impedance to either said system ground wire or said power line ground wire.

2. The test apparatus of claim 1, and wherein said load impedance is of a value such as to draw a current of approximately 10 amperes when connected to the supply line wires.

3. The test apparatus of claim 2, an a multiplier resistor connected in series with the meter.

4. The test apparatus of claim 3, and a shunting switch connected across the multiplier resistor.

5. The test apparatus of claim 4, and wherein the multiplier resistor has a value of approximately nine times the d.c. resistance of the meter.

* * * * *